United States Patent [19]

Hare, Sr.

[11] Patent Number: 5,161,653

[45] Date of Patent: Nov. 10, 1992

[54] ELECTRO-RHEOLOGICAL SHOCK ABSORBER

[76] Inventor: Nicholas S. Hare, Sr., 252 Pineville Rd., Monroeville, Ala. 36460

[21] Appl. No.: 803,033

[22] Filed: Dec. 6, 1991

Related U.S. Application Data

[63] Continuation-in-part of Ser. No. 696,104, May 6, 1991, abandoned, which is a continuation-in-part of Ser. No. 577,060, Aug. 31, 1990, Pat. No. 5,014,829, which is a continuation of Ser. No. 376,748, Jul. 3, 1989, abandoned, which is a continuation-in-part of Ser. No. 339,748, Apr. 18, 1989, abandoned.

[51] Int. Cl.$^5$ ............................................... F16F 9/46
[52] U.S. Cl. ........................... 188/267; 137/514.3; 137/409; 188/300; 188/318; 188/299
[58] Field of Search ............... 188/267, 299, 300, 318, 188/313, 298; 267/140.1 E; 137/514.3, 409; 251/129.2, 129.06

[56] References Cited

U.S. PATENT DOCUMENTS

| | | | |
|---|---|---|---|
| 2,781,869 | 3/1951 | Boehm et al. | 188/269 |
| 4,342,884 | 8/1982 | Ban et al. | 188/298 X |
| 4,768,627 | 9/1988 | Taylor | 188/312 X |
| 4,858,733 | 8/1989 | Noguchi et al. | 188/298 X |
| 4,896,752 | 1/1990 | Shtarkman | 188/267 X |
| 4,960,188 | 10/1990 | Wossner | 188/299 |
| 4,993,523 | 2/1991 | Schwemmer | 188/299 |
| 5,000,299 | 3/1991 | Goto et al. | |
| 5,029,677 | 7/1991 | Mitsui | 188/267 |

FOREIGN PATENT DOCUMENTS 0083476  4/1988  Japan ................................. 137/909

Primary Examiner—Robert J. Oberleitner
Assistant Examiner—Lee W. Young
Attorney, Agent, or Firm—Ferrill, Logan, Johns & Blasko

[57] ABSTRACT

An electro-rheological controlled shock absorber for use on motor vehicles is disclosed. The shock absorber employs a fluid filled cylinder, a piston member traveling in the cylinder, and an electro-rheological valve controlling the passage of fluid through the cylinder. In one embodiment of the present invention, the electro-rheological valve is placed in a by-pass passage to control the flow of fluid therethrough. In another embodiment of the present invention, the electro-rheological valve is placed in the piston to control the flow of fluid. The present invention is well adapted for use with all forms of shock absorbers.

30 Claims, 11 Drawing Sheets

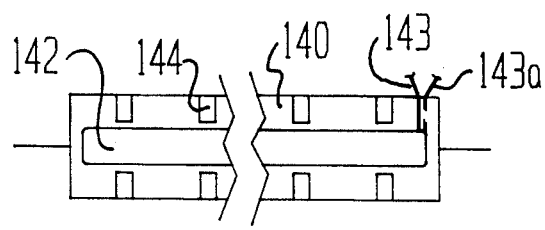
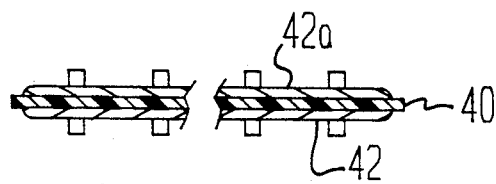
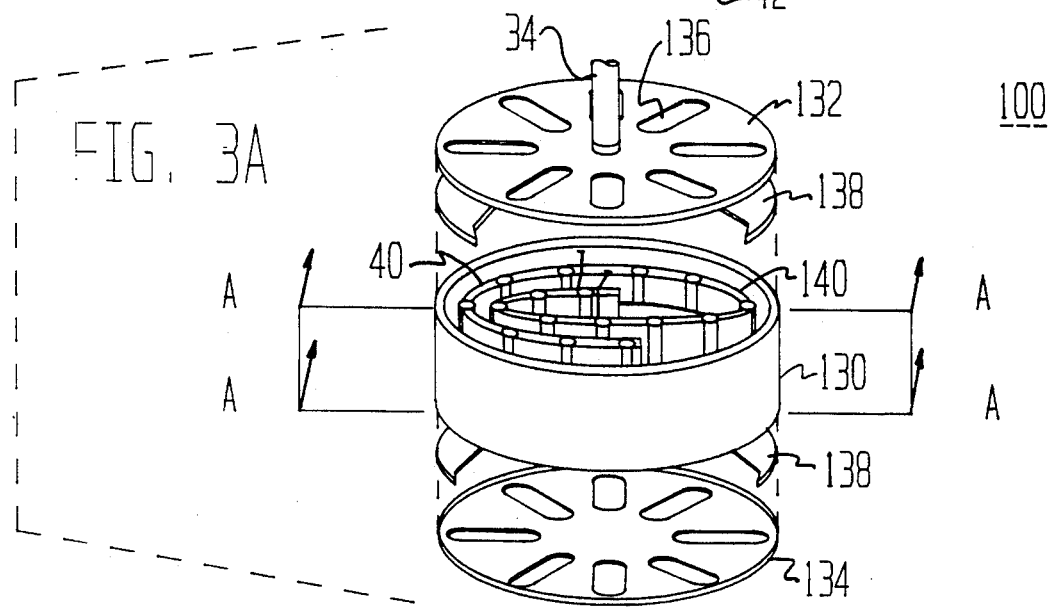
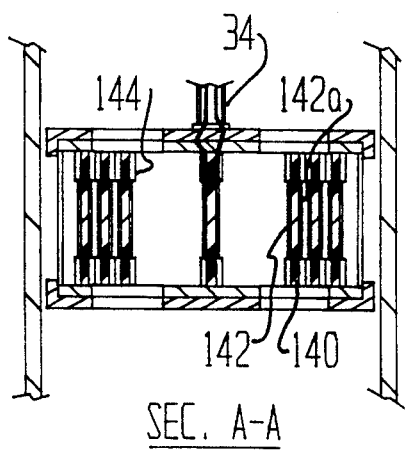

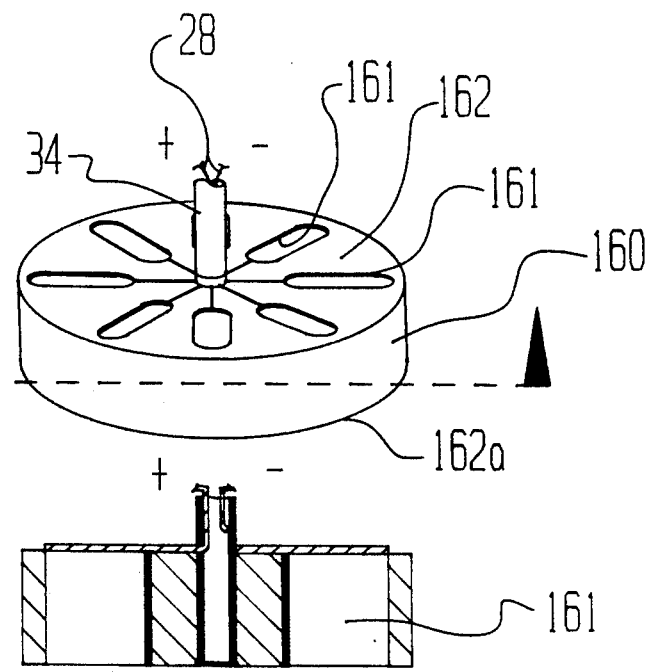
FIG. 5A
FIG. 5B
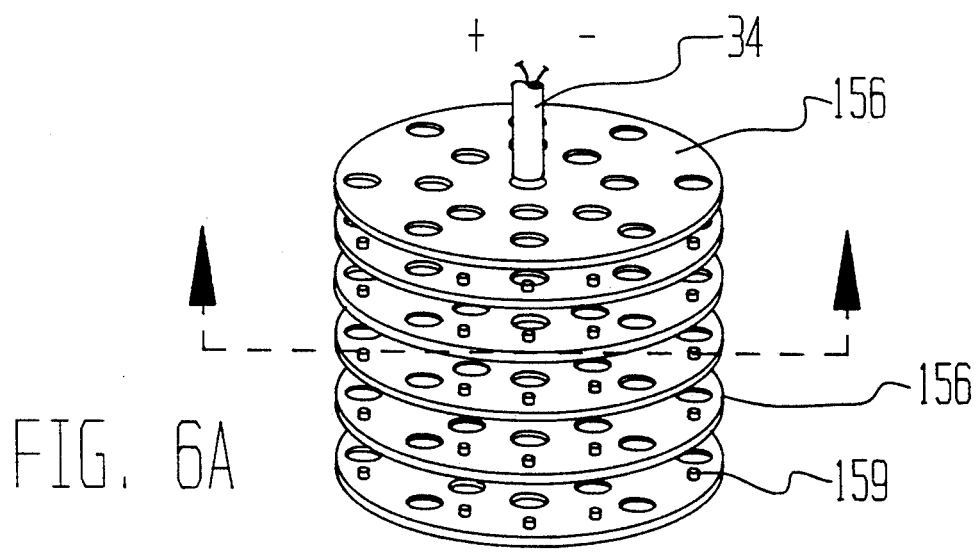
FIG. 6A
FIG. 6B

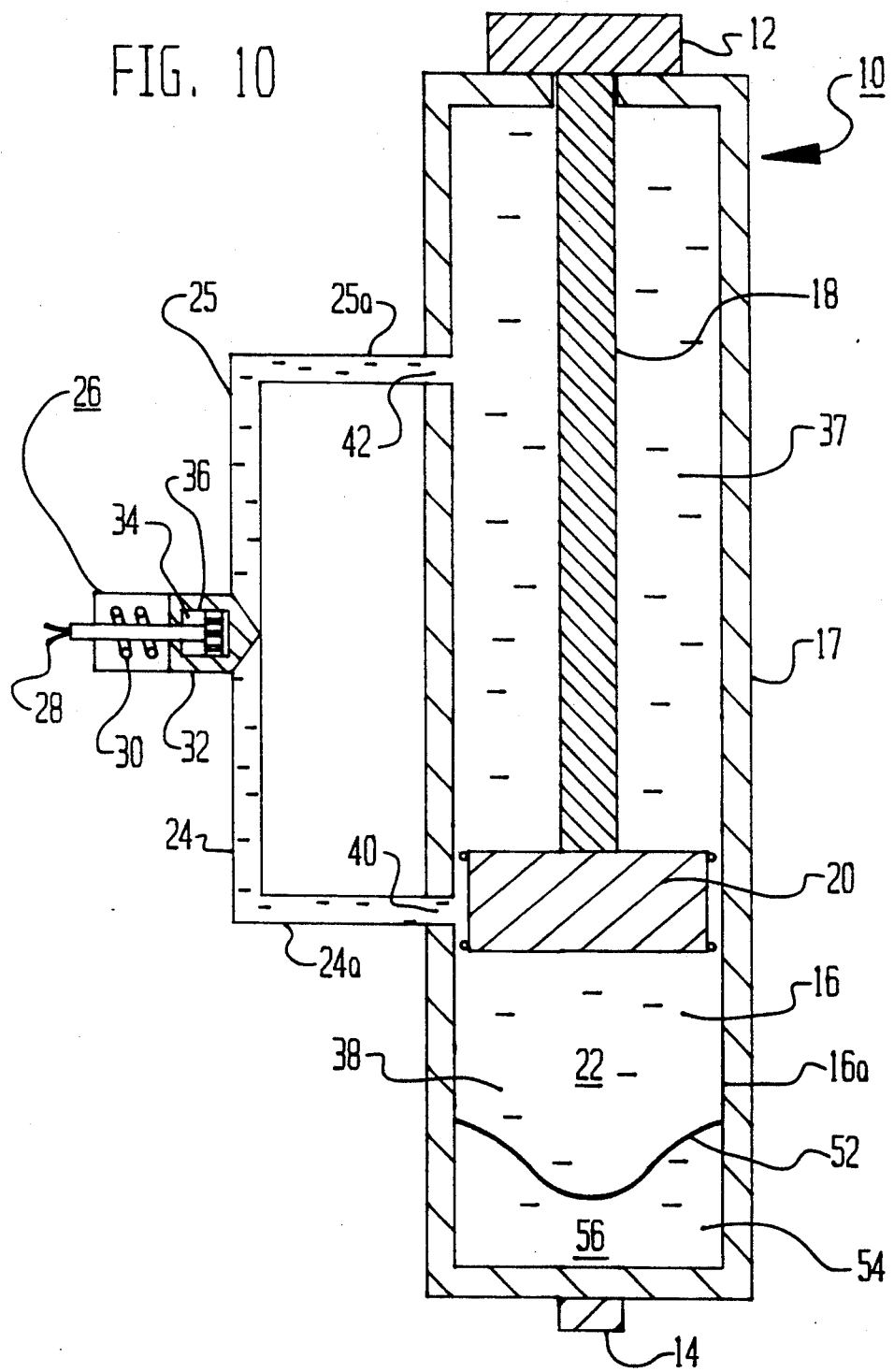

ELECTRO-RHEOLOGICAL SHOCK ABSORBER

This application is a continuation-in-part of co-pending U.S. patent application Ser. No. 696,104 filed May 6, 1991, now abandoned, which was a continuation-in-part of co-pending U.S. patent application Ser. No. 577,060 filed Aug. 31, 1990, now issued as U.S. Pat. No. 5,014,829, which was a continuation of U.S. appliaction Ser. No. 376,748, filed Jul. 3, 1989now abandoned, which was a continuation-in-part of U.S. patent application Ser. No. 339,748 filed Apr. 18, 1989, now abandoned.

BACKGROUND OF THE INVENTION

1. Field of the invention

The present invention is directed towards a novel shock absorber to be used in automobiles, trucks and similar devices. More particularly, the present invention relates to such shock absorbers employing electro-viscous and electro-rheological fluids.

2. Description of the Prior Art

Conventional shock absorbers are either of a single or double cylinder type. Single cylinder type absorbers have a cylindrical casing filled with fluid (e.g. pressurized gas or oil), and a reciprocating piston that travels within the casing in response to the movement of the struts used to suspend a chassis of an automobile.

Fluid pressure within the cylinder exerts a force opposing the piston travel, thus damping the movement and oscillation of the struts. In a single piston shock absorber, a rod supports the piston within the shock absorber casing and is attached to one of the ends of the strut. As the strut is compressed, the rod is thrust inside the casing, causing the piston and a section of the rod to travel longitudinally. The section of the rod that is thrust within the casing displaces a volume of compression fluid which must be compensated for in order for the shock absorber to function properly. As is known, the displacement of volume in the cylinder often results in mixing of liquid and gas, which can cause fluid foaming that impairs the damping action of the absorber.

Double cylinder type absorbers utilize telescoping outer and inner cylinders. A piston associated with the inner cylinder travels inside an oil filled casing in response to the movement and vibrations of a vehicle. When the piston travels downward, it compresses the oil, forcing it through a valve that is located at the lower end of the inner cylinder and controlling the passage of fluid between inner and outer cylinders. When the piston travels upward, corresponding to decompression of the strut, it forces the oil into the outer cylinder through a second valve located at the upper end of the inner cylinder and controlling a second passage between inner and outer cylinders. When the strut is thrust downward, only a slight damping is needed in order to preserve the spring action of the strut. Considerably larger damping action is required when the strut is extended. For that reason the orifice of the valve located in the lower end of the shock absorber is larger than the orifice in the upper valve.

It has been recognized for several decades that certain fluids respond to the influence of an electric potential by evidencing a rapid and pronounced increase in viscosity and an increased resistance to shear. Such electro-rheological or electro-viscous fluids comprise slurries of finely divided hydrophilic solids in hydrophobic liquids. In the absence of an electric field, these fluids behave in a Newtonian fashion, but when an electric field is applied, the fluids become proportionately more viscous as the potential of the electric field increases. In strong electric fields, the fluids can thicken into a solid. The electro-rheological phenomenon reverses when the electric potential is removed, and the material returns to its fluid state. Electro-rheological fluids change their state very rapidly when electric fields are applied or released, with typical response times being on the order of one millisecond. The ability of electro-rheological fluids to respond rapidly to electrical signals makes them well suited as elements in mechanical devices. Patents directed to compositions of electro-rheological fluids include U.S. Pat. Nos. 3,367,872, 3,047,507, and 4,033,892. Electro-rheological fluids have been extensively used in clutches as disclosed, for example, in U.S. Pat. Nos. 4,444,298 and 4,493,615.

Preliminary efforts directed toward using electro-rheological fluids in shock absorbers or other damping devices produced results that were costly because they required large quantities of the fluids and large electrified sleeves. An improved and less expensive design is disclosed in applicant's co-pending patent application, now issued as U.S. Pat. No. 5,014,829. That shock absorber utilizes a double cylinder design. In one disclosed embodiment, the shock absorber's inner cylindrical casing is filled with electro-rheological fluid and a perforated plunger travels up and down within the casing corresponding to the movement of a strut. The plunger incorporates electrodes positioned so that on activation of an electrical field within the plunger, electro-rheological liquid within the plunger's perforations will solidify. When the plunger moves downward, responding to strut compression, electro-rheological fluid can flow freely through the perforations. When the plunger moves upwards, responding to strut extension, an electronic control system energizes the electrodes within the plunger, solidifying the liquid within its perforations and creating a damping effect. That damping effect can be varied by adjusting timing, intensity and duration of the activation signal.

Another disclosed embodiment in the parent application utilizes a double cylinder oil filled shock absorber in which the flow of oil is controlled by an electro-rheological valve. The valve can be located either within the perforated plunger or in the passageway between the inner and outer casings of the shock absorber. The valve actuator is filled with electro-rheological fluid and contains a perforated piston incorporating one or more sets of electrodes. When the electrodes are energized, the fluid within the piston perforations becomes solid and the valve is positioned to block the flow of oil either through the perforations of the plunger, or through the passageway between inner and outer casings of the shock absorber.

Even though superior to prior designs of the electro-rheological shock absorbers, further improvement is believed possible to the invention disclosed in the parent application. In the parent application the size of the perforated plunger or of an interior electro-rheological valve tends to be limited by the overall size of the shock absorber. Since both the plunger and the valve have a relatively sophisticated internal structure consisting of electrode arrangements, elimination or relaxation of the limitations on size would reduce the overall cost of the device. Further, perforations in the plunger or valve orifices are necessarily small, and the flow of fluid through those perforations or valve orifices may become obstructed, creating some damping action even when the electrodes within the plunger or the valve actuator are not energized. Therefore, the range of the damping effect is limited by that initial damping experienced in the absence of electric field, and that unfavorably affects overall device controllability. Finally, the embodiment employing electro-rheological fluid as the compression fluid is believed to be prohibitively expensive given the present cost of such fluid.

In view of the above, it is a primary object of the present invention to provide a novel shock absorber with an electro-rheological flow control device that is not subject to stringent size limitations inherent in existing designs.

It is a further object of this invention to reduce the cost of manufacturing an electro-rheological shock absorber by relaxing the size limitations on the flow control device.

It is another object of this invention to provide an electro-rheological shock absorber that can be controlled with greater precision than previous devices by increasing the range and the magnitude of its damping effect and through a device configuration that makes flow control action more responsive to the changes in intensity of the controlling electric field.

It is still another object of this invention to provide an electro-rheological shock absorber of a single cylinder type which eliminates fluid foaming effects by compensating for volume displacement created during the downward travel of the plunger within the absorber's casing.

It is a still further object of this invention to provide an electro-rheological shock absorber which compensates for volumetric change in a manner alternative to a floating piston.

It is yet another object of this invention to provide an electro-rheological shock absorber that can be filled with a conventional compression fluid to reduce its cost.

It is a further object of the present invention to provide a shock absorber which is more stable than existing designs and less prone to misalignment and premature wear.

SUMMARY OF THE INVENTION

The present invention discloses an electro-rheological shock absorber of a single cylinder type capable of producing damping effects of different magnitudes in response to a control signal generated by an on-board vehicle computer or by other means.

In the preferred embodiment, the present invention comprises a cylindrical casing filled with an ordinary compression fluid, an arm member extending into the casing, a damping member that is attached to the arm and that divides the casing into upper and lower sections and a bypass passage that connects the sections of the casing and that is controlled by an electro-rheological valve. The damping member is attached to the vehicle chassis and reciprocates within the casing in response to movements and oscillations of the vehicle. As the damping member travels longitudinally, it compresses the fluid within the casing and forces it into the bypass passage.

The electro-rheological valve within the passage contains an interior chamber filled with electro-rheological fluid. Viscosity of electro-rheological fluids increases in an electric field and depends for its magnitude upon the field's duration and intensity. The electro-rheological valve is constructed so that when an electrical field is applied to the electro-rheological fluid within it, the change in the fluid's viscosity is translated into resistance to movement by the valve body from a position that completely or partially blocks the bypass passage. The damping member within the shock absorber casing encounters increased resistance to its longitudinal travel and a damping effect is created.

The present invention also contains means for compensating for volume displacement created during the downward travel of the plunger within the absorber's casing, thereby eliminating fluid foaming effects. Three such means are disclosed in the present invention, each of which may be utilized with any of the embodiments provided herein. First, an internal gas filled balloon, bladder or tube can be placed within the casing, the balloon contracting or expanding as necessary to accommodate the volume change. The balloon is provided with a neck or stem which is mounted through the casing, thereby providing means for inflating the balloon with gas under pressure after assembly. An alternative means comprises placing a flexible diaphragm or membrane between the main section of the working cylinder from a pressurized gas chamber. As the shock absorber fluid volume changes, the diaphragm moves into and out of the gas chamber as required by the volumetric changes. The chamber is charged with gas during manufacture, and may be designed to permit recharging during maintenance. The third means would eliminate changes or volume displacement, and involves using a double sided piston in conjunction with the damping member. As the damping member rises in the chamber, and the upper piston rod is removed from the chamber, the lower piston rod is drawn into the chamber, allowing for constant volume displacement within the chamber through the full range of motion of the damping member.

Another embodiment of this invention comprises a cylindrical casing filled with conventional compression fluid, a perforated damping member reciprocating within the casing and a hollow arm member that supports the damping member and also contains an electro-rheological valve. The valve is configured in such a way that when an electric field is applied to it, the perforations within the damping member itself are blocked. In this manner the damping member becomes essentially solid and a damping effect is created.

The magnitude of the damping effect depends on the intensity and duration of the electric field within the electro-rheological valve and can be controlled by an on-board computer, or other means.

DESCRIPTION OF THE DRAWINGS

The foregoing summary, as well as the following detailed description, will be better understood when read in conjunction with the drawings appended hereto. For the purpose of illustrating the invention, there is shown in the drawings embodiments which are presently preferred, it being understood that this invention is not limited to the precise arrangement and instrumentalities shown.

FIG. 3A is an exploded view of the spiral ring electrode configuration which may be utilized in the perforated piston of the valve depicted in FIG. 2.

FIG. 3B is a section view of the spiral ring electrode configuration which may be utilized in the perforated piston of the valve depicted in FIG. 2.

FIG. 3C is a section view of the spiral electrode along line A—A of FIG. 3A.

FIG. 3D is a section view of the spiral electrode configuration which may be utilized in the perforated piston of the electro-rheological valve shown in FIG. 2.

FIG. 5A is a three-quarter elevational view of a flow-through electrode configuration which may be utilized in the piston of the electro-rheological valve depicted in FIG. 2.

FIG. 5B is a sectional view of the electrode configuration of FIG. 5A.

FIG. 6A is an exploded view of the wafer electrode configuration which may be utilized in the piston of the electro-rheological valve depicted in FIG. 2.

FIG. 6B is a section view of the wafer electrode of FIG. 6A.

FIG. 10 is a section view of the shock absorber of FIG. 1 employing another embodiment of compensation means for volumetric change during use.

DETAILED DESCRIPTION OF THE INVENTION

Figure 1:
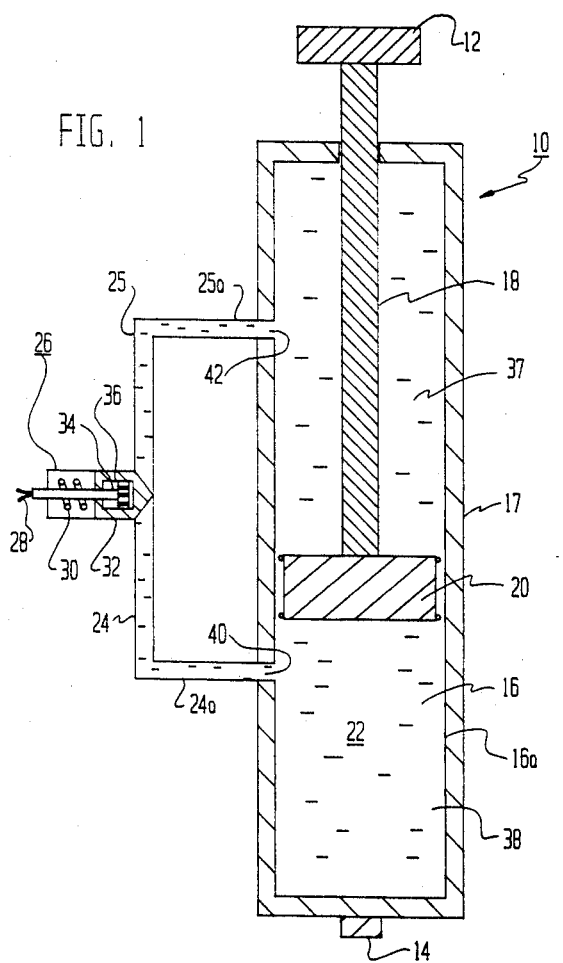
FIG. 1 is a section view of the shock absorber of the one embodiment of the present invention.

The present invention is described with reference to the attached figures wherein the same numbers are used where applicable. Referring to FIG. 1, the shock absorber 10 of the present invention is illustrated. The shock absorber 10 can be utilized to damp and control vibration and shock in all forms of vehicles, including automobiles and trucks. The shock absorber comprises a substantially cylindrical casing 17 containing an inner sealed chamber 16 defined by walls of an inner cylinder 16a. The sealed chamber contains standard compression fluid, usually oil 22. An arm member 18 extends through the center of both the cylindrical casing 17 and the inner chamber 16, and supports a damping member 20. Both the arm 18 and the damping member 20 can be either hollow or solid.

The shock absorber 10 is anchored to the hub and the chassis of a vehicle through connection members 12 and 14. Connection member 12 is attached to the arm member 18, and the damping member 20 remains the same distance from the connection member 12 at all time during operation (i.e. the damping member 20 does not reciprocate relative to connection member 12). The damping member 20 divides the inner chamber 16 into two sections: an upper section 37 and a lower section 38. The sections 37 and 38 are connected through a bypass passage comprising lower pipe sections 24, 24a, upper pipe sections 25, 25a and an electro-rheological valve 26. Sections 24a and 25a are connected to the inner chamber 16 sections 37 and 38 through ports 40 and 42.

When the strut of the shock absorber 10 experiences compression, the damping member 20 travels downwards through the compression fluid 22, forcing the fluid into the bypass passage. In its inactivated state, the electro-rheological valve 26 does not impede the flow of compression fluid through the passage. Thus minimum damping action is provided to protect the spring action of the strut itself. When the strut experiences expansion, it needs to be protected by larger damping action of the shock absorber 10. This is accomplished by activating the electro-rheological valve 26. The valve is capable of reducing the flow of oil through the bypass passage from 100% to 0%. The actual percentage of reduction of the flow is a function of the intensity and duration of the activation signal furnished to the valve by an on-board computer or other activation device. Since the greater obstruction to the flow of fluid the electro-rheological valve 26 provides, the greater will be the damping action of the shock absorber 10, it is possible to control the magnitude of the damping effect with considerable degree of precision.

Figure 2:
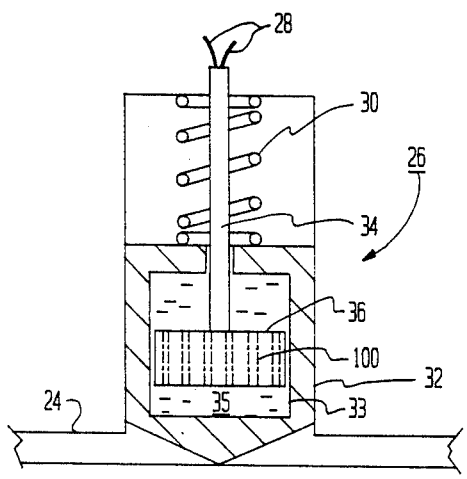
FIG. 2 is a section view of the electro-rheological valve employed as a flow control device in the embodiment of FIG. 1.

FIG. 2 illustrates the electro-rheological valve 26. The valve 26 comprises an exterior moveable chamber 32 the interior of which 33 is filled with electro-rheological fluid 35; a perforated piston 36 located within the chamber suspended in electro-rheological fluid 35; a stationary hollow arm member 34 supporting the piston and containing two insulated conducting wires 28; and a spring 30. The wires 28 extend down the hollow arm member 34 and are connected to the electrodes within the perforated piston 36.

Electro-rheological fluids comprise slurries of finely divided hydrophilic solids in hydrophobic liquids. In the absence of an electric field, these fluids behave in a Newtonian fashion, but when an electric field is applied, the fluids become more viscous as the potential of the electric field increases. The phenomenon reverses when the electric potential is removed, and the material returns to its fluid state. In strong electric fields, the fluid thickens into a solid.

There are numerous electro-rheological fluids which have been developed. Preferably, the present invention should be utilized with electro-rheological fluids which are designed to operate in high and low temperature environments such as those disclosed in U.S. Pat. Nos. 4,744,914 and 4,772,407, and which are incorporated herein by reference.

In the absence of an electric field, the electro-rheological fluid 35 contained in the valve chamber 33 moves freely through the perforated piston 36 contained in the valve chamber 33. The piston 36 is held stationary by the hollow arm member 34. The valve spring 30 exerts a biasing force upon the valve body 32 directed at urging the valve body 32 into the passage 24 (i.e. to a closed position). In the absence of compression fluid 22 flowing through the passage 24, the valve spring 30 acts on the valve body 32 to close the passage 24. During fluid 22 flow, the flow of compression fluid 22 through the passage 24 creates a tension against the valve body 32, pushing it out of the passage 24. This tension is counterbalanced by the valve spring 30, which is compressed by this fluid flow tension. The force of the spring 30 is calibrated so that, in the absence of an electric field within the perforated piston 36, the spring 30 will permit the fluid flow tension to force the valve body 32 fully out of the passage 24 so as not to impede the flow of compression fluid 22 through the passage 24. It should be understood that changes in fluid movement or fluid flow direction results in the reduction or elimination of fluid flow tension, and permits the valve spring 30 to bias valve 26 closed, partially or fully blocking the passage 24.

When electrodes within the perforated piston 36 are activated, the viscosity of the electro-rheological fluid 35 within the piston perforations 100 increases. The viscosity of the electro-rheological fluid 35 is a function of the intensity and duration of the electric field created by the electrodes within the piston 36. As the viscosity of the electro-rheological fluid 35 increases, the flow of electro-rheological fluid 35 through the piston perforations 100 is impeded, slowing the movement of the piston 36 through the valve chamber 33 and increasing the valve's 26 resistance to movement. When the electro-rheological fluid 35 within the piston perforations 100 solidifies, the piston 36 forms a solid barrier within the valve chamber 33, blocking the flow of the electro-rheological fluid 35 from one side of the piston 36 to the other. As a result, neither the biasing force from the spring 30 nor the tension force from the flow of compression fluid 22 through the passage 24 will cause the valve body 32 to move, as the electro-rheological fluid 35 within the chamber 33, no longer able to pass through the stationary piston 36, becomes fully compressed and resists further compression. This resistance effectively halts the movement of the valve body 32 in or out of passage 24, "locking" the position of valve 26. By applying an electric field within piston 36 at the correct time, valve 26 can be locked either entirely within passage 24 (i.e. "closed"), entirely out of passage 24 (i.e. "open"), or at any desired intermediate point. As discussed above, the position of the valve 26 relative to the passage 24 will control the magnitude of the damping effect.

Figure 1A:
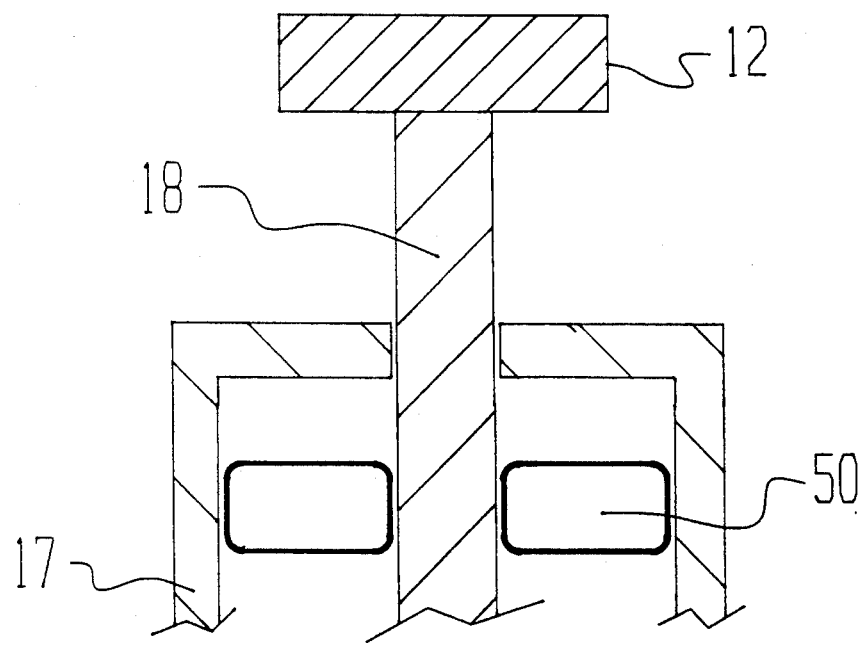
FIG. 1A is section view of the top of the shock absorber of the present invention employing one embodiment of compensation means for volumetric change during use.
Figure 10A:
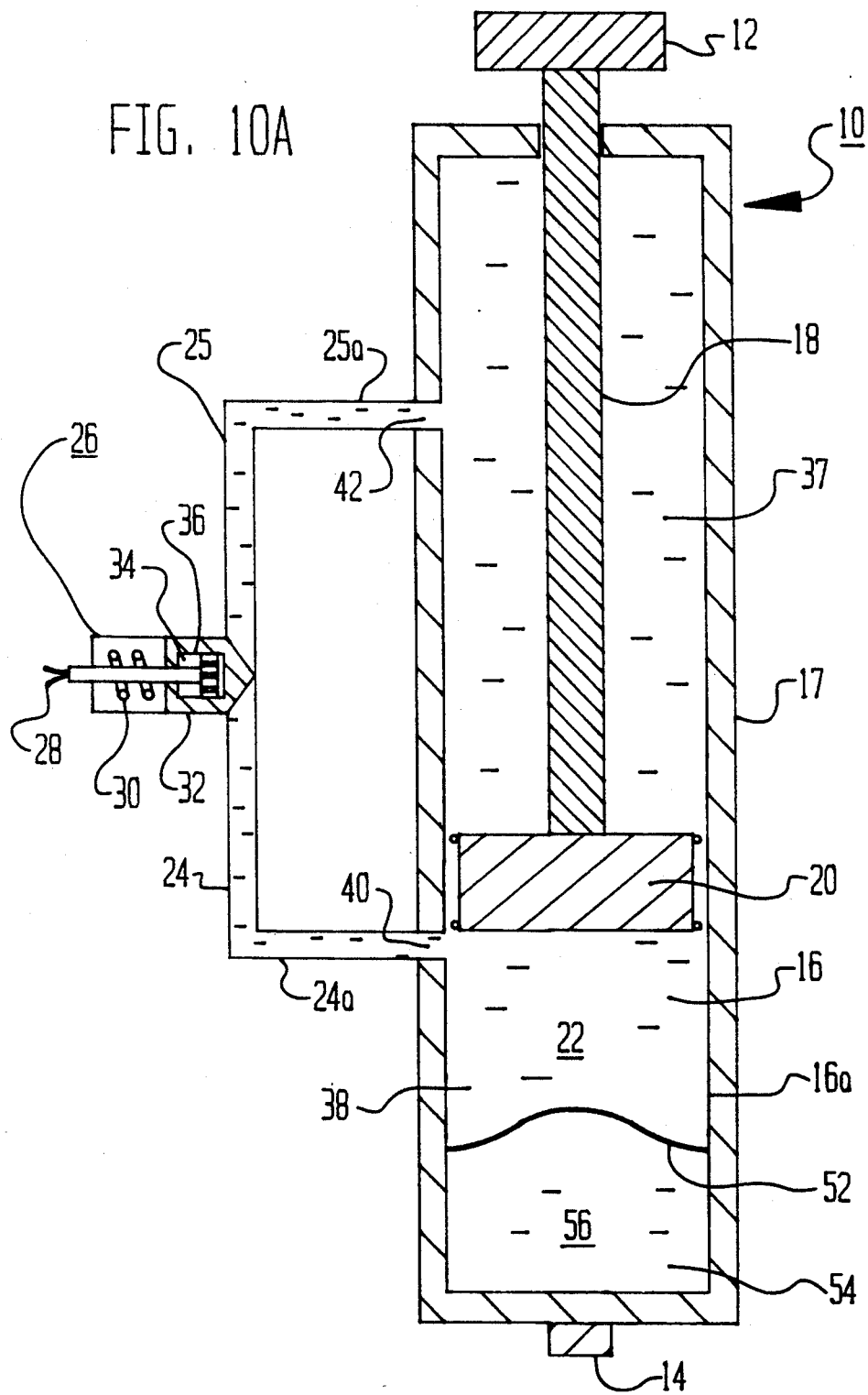
FIG. 10A is a section view of the shock absorber of FIG. 10 after partial withdraw of the piston.

As shown in FIGS. 1A, 10 and 10A, the present invention may provide means for compensating for volumetric change. FIG. 1A shows the invention incorporating a floating ring shaped gas filled tube or balloon 50 which surrounds arm member 18 and which accommodates volumetric changes in the chamber 16. Preferably, the balloon 50 should be constructed from neoprene or rubber and filled with an inert gas, such as nitrogen. The balloon 50 expands or contracts with the volumetric changes in the chamber 16. The expansion balloon 50 need not reciprocate with the fluid motion, and may be located at any convenient location in the chamber 16. It is generally recognized that these single tube shock absorbers operate better if the fluid in the main chamber is maintained under pressure. As a result, to pressurize the tube or balloon prior to manufacturer and assembly would be difficult and inconvenient, requiring special procedures such as increasing the pressure of surrounding air during assembly. To avoid this problem, the balloon 50 may be provided with a neck or stem (not shown) which is mounted through the casing 17, thus furnishing means for inflating the balloon 50 with gas under pressure after assembly is completed.

FIGS. 10 and 10A illustrate an alternative means for accommodating volume change. A flexible membrane or diaphragm 52 is placed between the main section of the working cylinder chamber 16 and gas chamber 54. The diaphragm may be constructed of rubber, neoprene, or any other highly resilient and highly flexible material. The diaphragm moves to and from against pressurized gas 56 as may be required in accommodating the changes in fluid volume within the chamber 16. In manufacture, the casing 17 may be fitted with an end cap which is pressed or screwed in place over its end below the damping member 20. The cap would hold the diaphragm 52 in place and comprise the diaphragm 52, the gas chamber 54 and connection member 14. The gas chamber 54 may be charged with pressurized gas 56 during manufacture. The gas chamber 54 may also be designed to provide means for charging after manufacture, such as during maintenance or repair. As shown in the figures, the diaphragm 52 moves into or is forced out of the chamber 16 as the volume displaced by the arm member 18 changes.

The preferred electrode configurations for the perforated piston 36 of the present invention are now described with reference to FIGS. 3, 4, 5 and 6. While the four preferred electro-rheological activating means are disclosed herein, it should be appreciated that any other such means may be employed without departing from the scope of the present invention. In each of the embodiments illustrated, the perforated or flowthrough piston member 36 contains a sequence of electrodes which, when activated by an electronic impulse, generate a plurality of electric fields which solidify the electro-rheological fluid 35 contained within the perforations, blocking the flow of electro-rheological fluid 35 through the solidified or semi-solidified member 36. The solidified or semi-solidified member 36 serves as a barrier within the chamber 33, resulting in the valve 26 resisting any movement caused by a force acting on the moveable body 32 as the remaining electro-rheological fluid 35 is fully compressed, immobilizing the valve body 32.

As shown in FIG. 3A-3D, the first flow through piston member comprises a hollow cylindrical housing 130 having respective top and bottom plates 132, 134, each having a plurality of elongated radial apertures 136. The top and bottom plates 132, 134 each compress respective perforated insulated layers 138. The perforations of the insulated layers align with apertures 136 situated on the top and bottom plates. The housing 130 contains a spiral thermally resistant polymer, mylar or plastic band or coil 140 which is coated with a metallic electrode 142, 142a on each of its sides. The metallic coatings 142, 142a can consist of copper, aluminum, silver, nickel or any other electrically conductive material. The band turns are separated by plastic spacer ribs 144 which create both channels for fluid flow as well as maintain the electrical integrity of the coil. At the center of the spiral, one metallic band 142 is connected to a positive terminal 143 with the other being connected to a negative terminal 143a.

As shown in FIG. 3B, the electric wiring extends through hollow arm member 34. The spiral coil 140 effectively forms a wound alternating sequence of positive and negative terminals. When the electrodes 143, 143a are activated, electro-rheological fluid 35 flowing through the apertures is solidified by the electric field formed between the walls of the spiral coil 140. The perforated piston 36 thus becomes a solid or semi-solidified barrier which impedes the flow of electro-rheological fluid 35 through the stationary piston 36, and provides resistance to forces acting upon the valve body 32 to move it in or out of the passage 24. Thus, damping can be achieved as follows: as the biasing force acting on the valve body 32, provided by the spring 30, exceeds the tension created by oil 22 flowing through the bypass passage 24, the valve body 32 moves into the passage 24 blocking it. By activating the electrodes 143, 143a at this juncture, the stationary piston 36 solidifies, locking the valve body 32 in place within the passage 24 and hampering the flow of oil 22 through the passage 24. This in turn creates increasing resistance to the movement of the damping member 20 within the casing of the shock absorber 10 and an increased damping action results.

Figure 4:
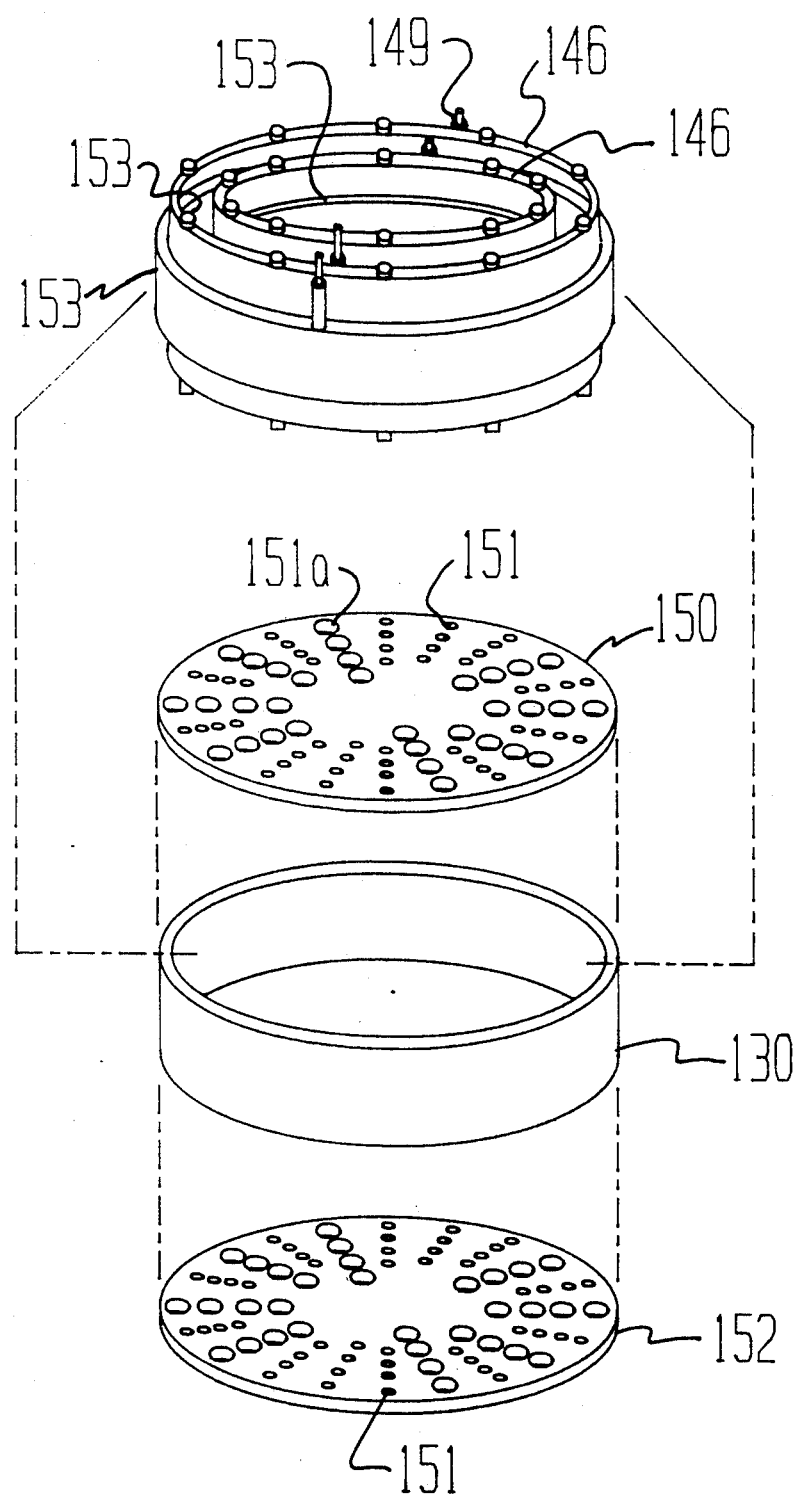
FIG. 4 is an exploded view showing concentric rings or cylinders of electrodes which may be utilized in the perforated piston of the electro-rheological valve depicted in FIG. 2.

Referring to FIG. 4, the flow through piston 36 comprises a sequence of concentric flat rings or bands 146. As with the first electrode configuration of FIGS. 3A-3D, the flat concentric rings or bands 146, which may be constructed of metal, ceramic, temperature resistant polymer, or similar material, fit within a cylindrical housing 148 and contain respective top and bottom perforated plate members 150, 152. Each ring of metal is oppositely charged or each ring of plastic is coated on opposite sides with a ring band electrode 153 which is then connected via a positive or negative terminal 149 to holes 151 and through to rod 34 (not shown).

In operation, electro-rheological fluid 35 flows between the concentric electrode rings 146 and into the upper portion of the housing 148. When the piston 36 is electrified, a plurality of electric fields is created between the electrodes on the concentric bands, thereby solidifying the electro-rheological fluid 35 situated therebetween. As with the embodiment of FIGS. 3A-3D, upon the activation of an electrical impulse, the perforated piston 36 transforms into a solid or semi-solid barrier which restricts the flow of electro-rheological fluid 35 through the stationary piston 36, immobilizing the valve body 32.

Referring to FIGS. 6A and 6B the perforated piston 36 contains a multiple sequence of perforated metallic disk-shaped wafers 156 through which the electro-rheological fluid 35 flows. The wafers 156, forming flow-through screens, are configured alternatingly in a positive to negative relationship, and are retained in a non-contacting position by posts 159 or by separator ring washers (not shown). In this embodiment, the housing (not shown) may itself serve as the negative terminal, with alternating wafers 156 being maintained in electrical contact with the housing. The positive wafers are electrically insulated from the negative piston head and are in contact with a positive terminal which is insulated from the housing and which extends through rod 34. During operation, electro-rheological fluid 35 flows through the parallel disposed disk shaped wafers. In some designs, it may be advantageous to off-set the orifices in the disc shaped wafers 156, so as to increase the shear factor when the electro-rheological fluid 35 is solidified. When the electrodes are activated, a multiplicity of electric fields is generated between the respective positive and negative terminals formed by the wafers. The electro-rheological fluid 35 within each of the fields in the piston 36 solidifies and the piston 36 forms a solid or semi-solidified barrier. The solidified barrier halts the flow of electro-rheological fluid 35 through the stationary piston 36, compressing the remaining electro-rheological fluid 35 and thereby locking the valve body 32 position.

A final embodiment of the electro-rheological valve piston 36 is illustrated in FIGS. 5A and 5B. As with the previous embodiments, the piston head comprises a cylindrical casing having perforated top and bottom members 162, 162a. The casing contains a molded temperature resistant plastic disk 160. Disk 160 contains numerous radially extending apertures 161 through which electro-rheological fluid can flow and which are mated with the top and bottom members 162, 162a. The opposite sides of each radial aperture are coated or plated with copper or other conductive material and function as respective positive and negative electrodes. The electrodes are parallel and separated at a uniform distance. The width of each aperture 161 should be between 0.5 and 1.5 millimeters. As shown, insulated electric wires 28 are extended through hollow arm 34 and electrify the opposite sides of each aperture 161. Electro-rheological fluid 35 flows through the apertures 161 until electrified. When the electrodes are activated, the electro-rheological fluid 35 contained within each aperture 161 solidifies, and the flow through piston 36 forms a solid or semi-solid barrier within the valve chamber 33.

Figure 7:
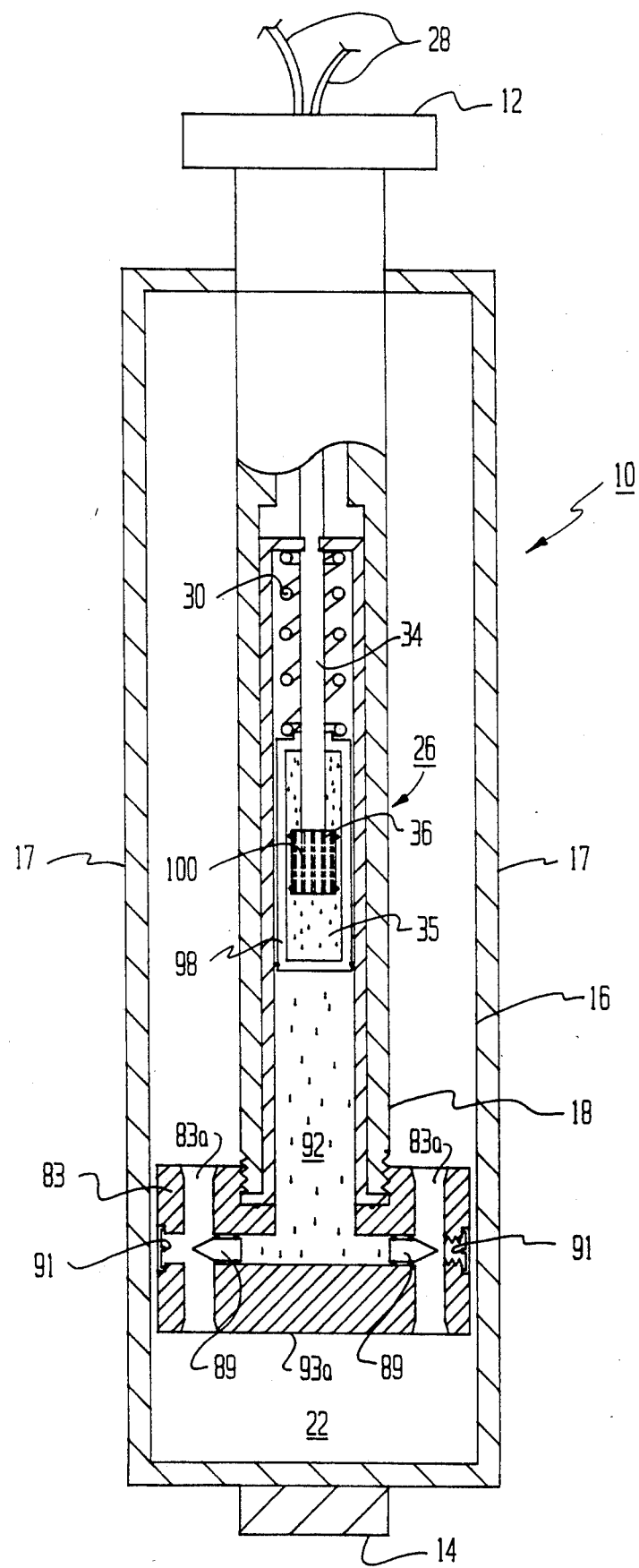
FIG. 7 is a section view of an embodiment of the present invention employing a perforated damping member positioned within the shock absorber casing.

FIG. 7 illustrates another embodiment of the present invention. In this embodiment the electro-rheological shock absorber 10 comprises a single cylindrical casing 17 and a perforated damping member 83 supported by a hollow arm member 18 and an electro-rheological valve 26 for controlling the degree of damping. The shock absorber is attached to a vehicle's chassis and hub through connection members 12 and 14. An interior chamber 16 of the absorber is filled with oil, gas, or any other compression fluid 22. Inside the arm member 18, a valve piston 98 filled with electro-rheological fluid 35 is provided. An internal perforated piston member 36 is provided within the fluid 35. In its preferred embodiment, the piston is an electrode, having one of the configurations of FIGS. 3A-6, held stationary within the valve piston 98 by a rod 34. The damping member 83 contains perforations 83a which are opened and closed by electro-rheologically controlled needle valves 89 inserted into and retracted from the perforations 83a. The needle valves 89 are inserted into and retracted from valve seats 91. The interior of the arm member 18 between the valve piston 98 and the needle valves 89 is also filled with oil or another compression fluid 92. When no damping action is required, oil flows freely through the damping member perforations 83a, exerting an inward pressure on the needle valves 89. The needle valves 89 are thrust inward and the valve piston 98 is thrust upward against a biasing spring 30. The biasing spring 30 must be calibrated to permit the needle valves 89 to be thrust inward when the damping member 83 travels longitudinally in either direction.

The piston member 36 may comprise any suitable electro-rheological activating construction, such as one of the four electrode configurations disclosed herein and depicted in FIG. 3 through 6. Electrodes may be activated through wires 28 that extend up the shaft of the arm member 18. When an electric field is applied to the electrodes contained within the perforated piston 36, electro-rheological liquid within the perforations becomes solid or semi-solid. The piston member 36 is thus transformed into a solid barrier halting the flow of electro-rheological fluid 35 through the perforated piston member 36 and providing resistance to any pressure exerted against the valve piston 98, effectively locking the valve piston 98 in place.

During a period of reduced fluid flow tension and in the absence of an electric field, the biasing spring 30 exerts a biasing force on the valve piston 98, causing the valve piston 98 to travel downwards in the fluid 92 and to thrust the needle valves 89 into the damping member perforations 83a. Once the needle valves 89 are in their desired position with respect to the perforations 83a, the application of the electric field will solidify the piston member 36 and lock the valves 89 in place for the duration of the electric field activation. As the flow of oil 22 through the perforations 83a becomes obstructed, a damping effect is created. That effect is a function of the needle valves 89 within the perforations 83a, and the intensity and duration of the signal activating the electrodes within the electro-rheological valve internal plunger 36.

It should be further appreciated that a needle valve 26 such as the valve illustrated in FIG. 2 may also be employed in the piston of the shock absorber shown in FIG. 7. It is believed that complexity and expense may be limited by simply positioning such a needle valve in the perforations 83a in the piston.

Essentially, it should be evident that the embodiment shown in FIG. 7, which utilizes conventional compression fluid, may be constructed so that each damping member perforation 83a contains the control device disclosed in FIG. 2, the control device replacing the needle valve 89 in the damping member perforation 83a. The nose of valve body 32 acts as a needle valve moving in and out of the damping member perforation 83a within the damping member 83 which connects the upper section and the lower section of the chamber. This arrangement not only eliminates the control mechanism inside the arm member 18, but provides a more direct valve control than that illustrated in FIG. 7, and also may be somewhat simpler to manufacture.

Figure 8:
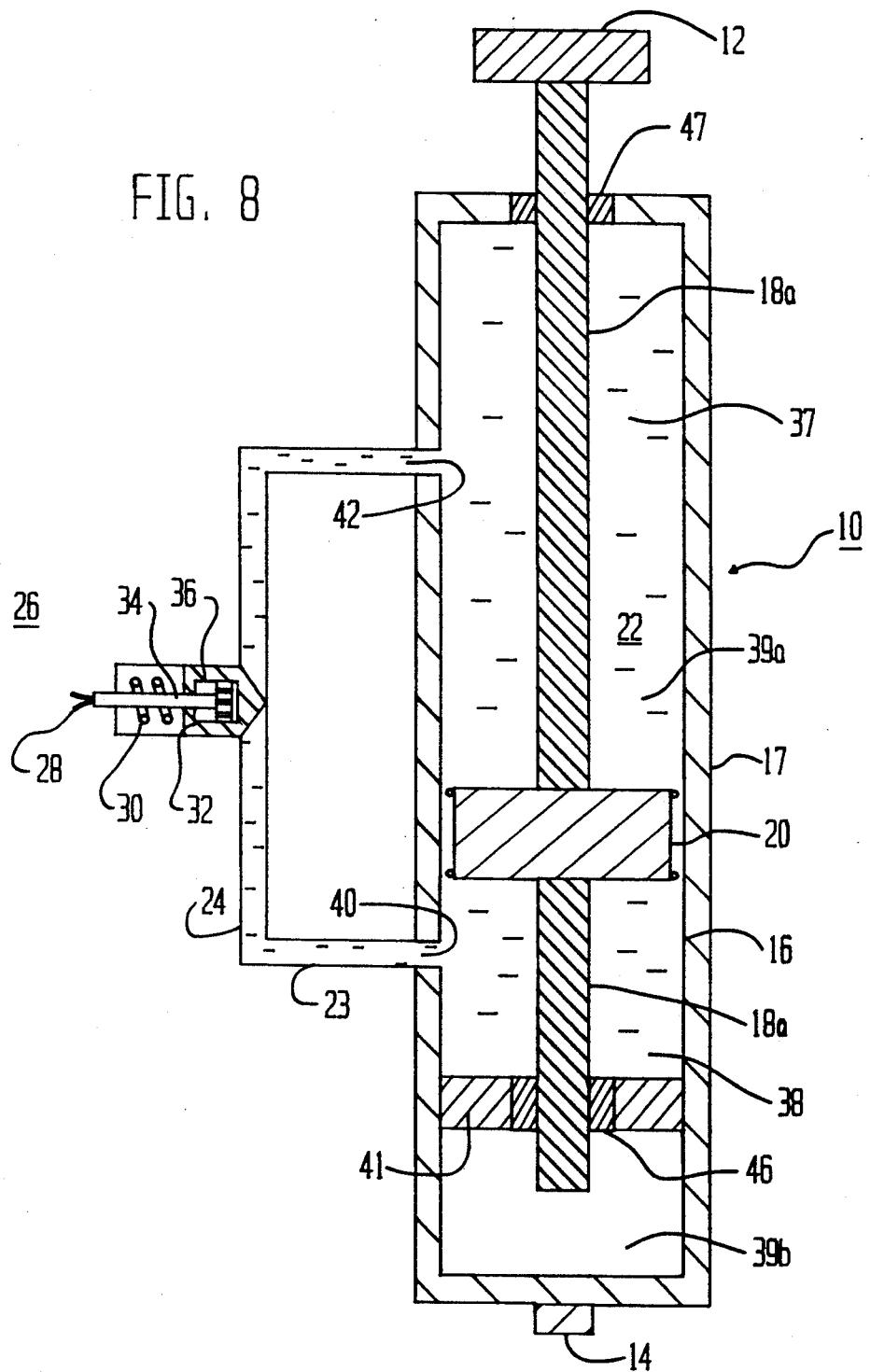
FIG. 8 is a section view of another embodiment of the present invention employing a casing divided into two chambers and a rod passing through both chambers.

Another embodiment of the present invention is illustrated in FIG. 8. The difference between this configuration and the preferred embodiment of FIG. 1 is that the internal chamber 16 is lengthened and divided into an first chamber 39a and a second chamber 39b by a divider 41. An arm member or rod 18a supports the damping member 20 and extends through the first chamber 39a, through the divider 41 and into the second chamber 39b. A bushing 46 should be provided in the divider 41 to support the rod 18a and prevent compression fluid from passing from the first chamber 39a into the second chamber 39b. A bypass passage 24 containing the electro-rheological valve 26 connects an upper section 37 and a lower section 38 of the first compartment 39a. It should be appreciated that this configuration may be advantageously employed in conventional shock absorbers and it is particularly adaptable to strut-type suspensions.

Previously, the prevalent method used in single tube shock absorbers to accommodate fluid volume change due to piston and piston rod movement into and out of the compression chamber involves employing a gas chamber separated from the hydraulic oil by a floating separator piston. This method is used by Bilstein and others, and is effective but expensive. Two alternatives, shown in FIGS. 1A, 10 and 10A, have been discussed above as providing new and different methods for accommodating oil volume change: a gas filled flexible tube or balloon which expands or contracts under the volumetric changes; and a diaphragm separating the working cylinder from a pressurized gas chamber which advances into or retreats from the cylinder due to volumetric changes.

The main objective of the shock absorber configuration of FIG. 8 is to eliminate rather than merely compensate for the volume displacement created by longitudinal travel of the rod 18 attached to the damping member 20. The employment of an extended or "double" rod piston, as shown in FIG. 8, provides a better alternative method for avoiding volumetric change, eliminating volumetric changes as the support rod 18a moves into or out of the compression chamber 39a. In the configuration of FIG. 1, is thrust out of the shock absorber's casing, thus increasing the available volume within the internal chamber 16. This volume differential must be compensated for in some manner. In the configuration of FIG. 8, the rod 18a extends below the damping member 20, ensuring that the volume of the rod 18a within the chamber 16 remains identical on both sides of the damping member 20 throughout the member's 20 full range of movement. The double rodded piston avoids volume differential except for volume changes due to temperature. This is believed to decrease the possibility of foaming and breakdown of compression fluid and to increase the effective life of the shock absorber.

Another advantage of the shock absorber configuration of FIG. 8 is that the rod 18a has three points of support: at the connection member 12, at bushing 47 where the rod 18a enters the casing 17, and at the rod's junction 46 with divider 41. This improves the stability of the rod 18a and helps maintain its alignment. The rod 18a in this configuration also provides a better mechanical support for the damping member 20 thus avoiding misalignment of that member in relation to upper and lower walls of the cylindrical chamber 16 and reducing premature wear of the shock absorber's internal parts.

Figure 9:
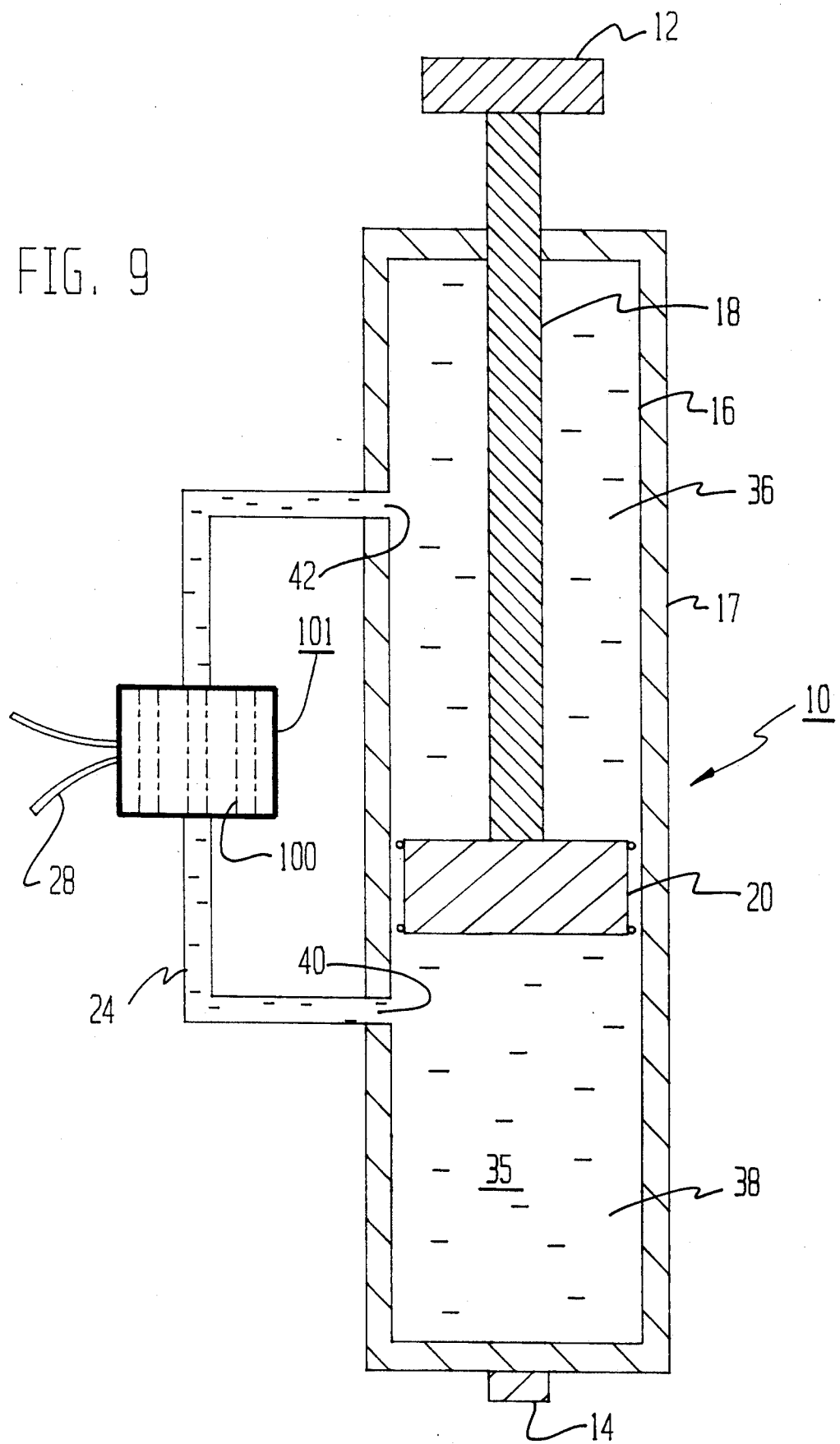
FIG. 9 is a section view of a further embodiment of the present invention employing a perforated valve member in the bypass passage as a flow control device.

A further embodiment of the present invention is shown in FIG. 9. In this configuration, electro-rheological fluid 35 is employed in place of a regular compression fluid within the internal chamber 16. Use of electro-rheological fluid permits use of a valve member 101 (shown enlarged for detail) in the bypass passage 24 to comprise solely a perforated piston, such as those illustrated in FIGS. 3 through 6. The electrodes within the valve member are activated through insulated wires 28. In the absence of an electric field, electro-rheological fluid 35 will flow freely through the bypass passage 24. On application of an electric field, the viscosity of the fluid within the perforations 100 of the valve member 101 will increase, the flow will decrease, and there will be an increasing resistance to a longitudinal travel of the damping member 20 within the shock absorber casing 17. This creates a damping effect that will be a function of the duration and intensity of the electric field created within the valve member 101. An embodiment such as this is believed to hold great promise as the cost of electro-rheological fluid decreases. It should be evident that similar use of electro-rheological fluid may be employed with the other embodiments of the present invention disclosed herein.

It is to be understood that in embodiments utilizing electro-rheological fluids as the compression medium, the piston generally shown as 20 may incorporate the electro-rheological valving shown generally as 36 to provide a flow-through piston head with controllable valving.

The present invention is particularly useful in aircraft applications as it provides both convenient and rapid means for changing the resistance of the shock absorber from minimum to maximum when and as rapidly as desired. For instance, during landing, at the instant of wheel touchdown, it may be desirable that the shock absorber be as soft as possible; then, the resistance can be increased as rapidly as required to absorb the shock. Moreover, the shock absorber action can be modulated to accommodate the changing of aircraft weight and load.

Figure 11:
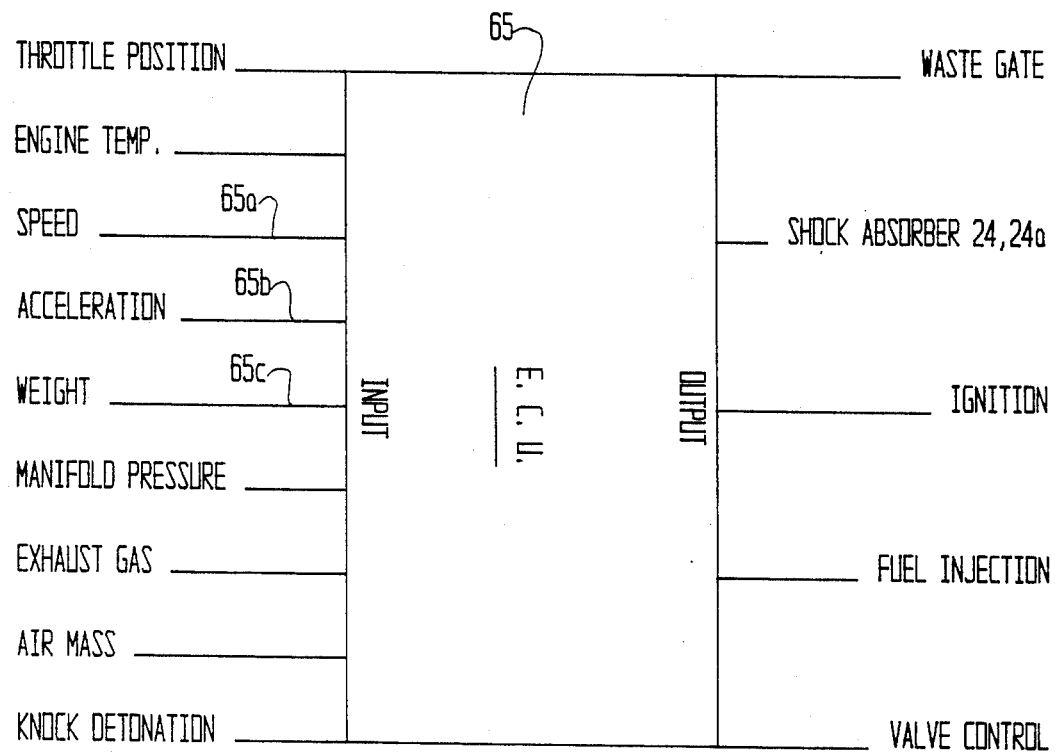
FIG. 11 is a schematic representation of an electronic control system for use with the present invention.
Figure 12:
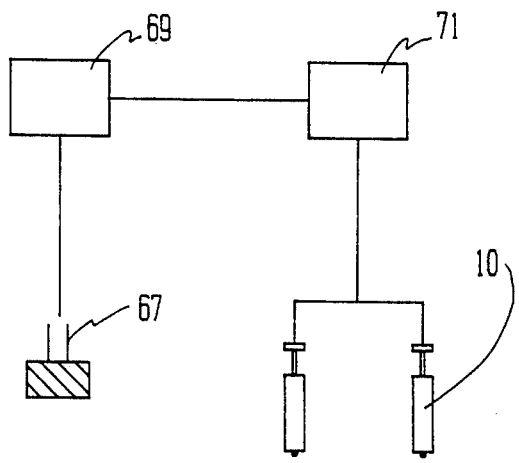
FIG. 12 is a schematic representation of a simplified control system for use with the present invention.

The electro-rheological shock absorbers of the present invention may be controlled by any conventional means, including an on-board control unit. One such control unit 65 is shown in FIG. 11. The control unit of the preferred embodiment comprises a conventional microprocessor or computer 65 which provides timing signals to control the electrification of the electro-rheological fluid contained within the shock absorber. Based upon various operating parameters, such as speed 65a, acceleration 65b, vehicle operating weight 65c, and the compression of the struts, the damping characteristics of the shock absorber can be precisely controlled. The shock absorber is adjusted by varying the timing, intensity and duration of the activation signals. The perforated member instantaneously (within one millisecond) solidifies or becomes flow restrictive, and the electro-rheological fluid effectively transforms the member into a solid or semi-solid barrier which prevents or impedes further flow of fluid through the perforations. By adjusting the timing and duration of the electrode activation, the damping effect of the shock absorber can be precisely controlled. It is to be noted that the control unit will typically provide different levels of damping depending upon whether the strut is in compression or expansion. The member 36 will provide only slight damping during strut compression, but significant damping effect during strut expansion.

While the control mechanism has been described in the context of an on-board computer or microprocessor, it is to be appreciated by those skilled in the art that other mechanisms can be utilized to control the activation of the electrodes. These alternative devices include readily available piezoelectric accelerometers, and mercury switches sensitive to sudden shifts, accelerations and decelerations of the vehicle. Such devices will sense sudden braking, acceleration or sudden turns causing dipping, squatting or rolling and will direct current to the appropriate shock absorber to prevent excessive dips or lean in that direction.

As is shown in schematic in FIG. 11, another control circuit which is believed to hold great promise is to tie the control of the shock absorber to a brake light circuit of the vehicle. As is known, in virtually all vehicles the activation of brake pedal 67 causes activation of the vehicle's brake light electrical system 69. In this embodiment, the shock absorbers' electro-rheological valve activation means 71 of some or all of the shock absorbers are tied to the brake light electrical system 69, so that the shock absorbers 10 are simultaneously activated with the brake lights. In this manner, the damping force of the shocks is increased as the vehicle decelerates. This is believed to be a practical and inexpensive alternative to more complex shock absorber control mechanisms, providing for surer stops and preventing front end dip during emergency braking.

The foregoing invention has been described with reference to the above disclosure. It is to be recognized by those skilled in the art that other embodiments fall within the spirit and scope of the invention and that the true scope of the invention is to be determined with reference to the claims appended thereto. Specifically, it will be clear to those skilled in the art that alternative embodiments can utilize any combination of the several placement configurations shown and described herein.

What is claimed is:

1. A shock absorber comprising:
   a casing, said casing including a generally cylindrical chamber containing compression fluid;
   a damping member which reciprocates in the chamber and which restricts the flow of fluid through the chamber, the damping member dividing the chamber into a first section and a second section;
   the casing being attached to means to anchor the shock absorber at a first end, relative to which the casing does not reciprocate;
   the damping member being attached to means to anchor the shock absorber at a second end, relative to which the damping member does not reciprocate;
   a by-pass passage external to but in fluid communication with said chamber, said passage permitting fluid communication between the first section and the second section of the chamber;
   a moveable valve member in the by-pass passage controlling the flow of fluid between the first and second sections of the said chamber, the movement and position of said valve member controlled by electro-rheological actuating means impeding the movement of said valve member from the position said valve member was in when an electric field is applied by the electro-rheological actuating means;
   wherein the valve member controls the amount of damping of the shock absorber by regulating the amount of compression fluid which passes through the by-pass passage.

2. The shock absorber of claim 1 wherein the electro-rheological actuating means comprises:
   a moveable chamber, having an interior filled with electro-rheological fluid and an exterior surface, the relative position of the exterior of the chamber controlling the relative position of the valve member;
   bias means providing tension against said moveable chamber;
   piston means within the electro-rheological fluid having perforations therethrough permitting the flow of electro-rheological fluid through the piston means;
   electrode means integral with the piston means for generating an electric field between at least one positive and one negative electrode such that said electro-rheological fluid within said piston solidifies thus controlling the position and movement of the moveable chamber relative to the piston means;
   whereby the relative position of the piston means in relation to the moveable chamber controls the relative position of the exterior of the moveable chamber.

3. The shock absorber of claim 2 wherein said valve actuating means is in communication with the valve member by direct contact with said valve member.

4. The shock absorber of claim 3 wherein said valve actuating means is integral with said valve member.

5. The shock absorber of claim 2 wherein said valve actuating means is in communication with the valve member by asserting pressure against an intervening body, which intervening body is in turn asserting pressure against the valve member.

6. The shock absorber of claim 5 wherein said intervening body comprises a fluid.

7. The shock absorber of claim 2 wherein said perforated piston member comprises a cylindrical disk having a plurality of apertures extending therethrough to permit the flow of electro-rheological fluid through said disk, each aperture containing a negative and positive electrode such that when said electrodes are activated, an electric field is generated in each aperture, thereby solidifying the electro-rheological fluid contained therein.

8. The shock absorber of claim 7 wherein the width of each of said apertures is between 0.5 and 1.5 millimeters.

9. The shock absorber of claim 2 wherein said perforated piston member comprises a spiral coil member contained within a perforated cylindrical casing, said spiral coil member containing positive and negative electrodes located on opposite sides of said spiral coil such that said spiral coil forms an alternating sequence of positive and negative terminals, whereby the application of an electrical impulse to said electrodes generates a plurality of electric fields within said spiral coil thereby solidifying the electro-rheological fluid located within said coil.

10. The shock absorber of claim 9 further comprising a plurality of rib members attached to said spiral for maintaining the electrical integrity of said spiral coil when it is placed within said perforated cylindrical casing.

11. The shock absorber of claim 2 wherein said perforated piston member comprises a plurality of concentric bands, each of said bands having a positive electrode on a first side and a negative electrode on a second side, the positive electrode on a first band being in proximity to a negative electrode on a second band, such that upon the application of an electric signal to said electrodes, a plurality of electric fields are formed between said bands and the electro-rheological fluid between said bands solidifies.

12. The shock absorber of claim 1 wherein said concentric bands are retained within a hollow cylindrical casing having top and bottom members, said top and bottom members being perforated so as to permit the flow of electro-rheological fluid through said cylindrical casing.

13. The shock absorber of claim 2 wherein said perforated piston member comprises a hollow casing supporting a plurality of parallel disposed perforated disk-shaped metallic wafer members, said metallic wafer members forming a sequence of alternating positive and negative electrodes such that upon the application of an electrical impulse to said wafer members, a plurality of of an electrical impulse to said wafer members, a plurality of electric fields is formed between said alternating wafer members, thereby solidifying the electro-rheological fluid situated therebetween.

14. The shock absorber of claim 2 wherein activation of the electrode means is tied to activation of a vehicle's brake light electrical system.

15. The shock absorber of claim 1 wherein the means attached to the damping member to anchor the shock absorber at a second end comprises a rod member attached to the damping member, which rod member passes out of the casing and terminates in the second end of the shock absorber.

16. The shock absorber of claim 15 further comprising means for accommodating changes in compression fluid volume due to thermal changes and to the movement of the rod member into and out of the casing.

17. The shock absorber of claim 16 wherein said accommodating means is a flexible balloon filled with an inert gas.

18. The shock absorber of claim 17 wherein said accommodating means is a ring-shaped nitrogen filled balloon which surrounds the rod within the chamber.

19. The shock absorber of claim 16 wherein said accommodating means comprises a flexible diaphragm within the casing separating the chamber and a gas compartment.

20. The shock absorber of claim 19 wherein the gas compartment contains an inert gas, the gas compartment further being pressurized.

21. The shock absorber of claim 1 wherein the damping member is adapted to reciprocate in the chamber even when there is no fluid flow through the by-pass passage.

22. The shock absorber of claim 21 wherein the by-pass passage is employed to provide greater precision and control in the damping of the shock absorber.

23. The shock absorber of claim 1 wherein the second end of the shock absorber comprises a connection member.

24. The shock absorber of claim 1 wherein the first end and the second end of the shock absorber comprise connection members.

25. A shock absorber, having a first end and a second end, comprising:

a casing, including a first chamber, a second chamber and a divider between the first and second chamber preventing fluid communication between the first and second chambers;

electro-rheological compression fluid within the second chamber;

a rod which reciprocates in the casing, the rod being positioned axially within the first chamber, and passing axially through the divider and the second chamber, and passing out of the casing and terminating at the second end of the shock absorber;

a damping member which reciprocates in the second chamber and which restricts the flow of fluid through the second chamber, the damping member dividing the second chamber into a first section and a second section;

the damping member being attached to that portion of the rod passing through the second chamber so that the damping member does not reciprocate relative to the second end of the shock absorber;

the casing being attached to means to anchor the shock absorber at its first end, relative to which the casing does not reciprocate;

a by-pass passage external to but in fluid communication with second chamber, said passage permitting fluid communication between the first section and the second section of the second chamber;

a valve member in the by-pass passage controlling the flow of fluid between the first and second sections of the second chamber; the valve member controlled by electro-rheological actuating means comprising a perforated valve member situated within said by-pass passage to permit the flow of electro-rheological fluid therethrough; and electrode means coupled to said perforated valve member for generating an electric field within said valve member such that a second quantity of electro-rheological fluid contained therein solidifies, thereby impeding the flow of the electro-rheological fluid through said bypass passage and thereby creating a compressive damping force by said damping member; and wherein the presence of the rod on both sides of the damping member in the second chamber assists in equalizing volume throughout the second chamber.

26. The shock absorber of claim 25 wherein activation of the electrode means is responsive to activation of a vehicle's brake light electrical system.

27. A shock absorber comprising:
a casing including a chamber containing compression fluid;
a damping member reciprocating in said chamber attached to an arm extending from said chamber;
said damping member containing a plurality of perforations to permit the flow of fluid breakthrough;
valve means for controlling the flow of the compression fluid, said valve means comprising:
a valve member for insertion into the compression fluid, controlling the amount of compression fluid passing said valve member; and an electro-rheological actuating means in communication with the valve member and which controls the movement of the valve member;
said electro-rheological actuating means comprising:
a moveable chamber, having an interior filled with electro-rheological fluid and an exterior surface, the relative position of the exterior of the chamber controlling the relative position of the valve member; bias means providing tension against said chamber; stationary piston means within the electro-rheological fluid having perforations therethrough permitting the flow of electro-rheological fluid through the piston means; electrode means integral with the piston means for generating an electric field between at least one positive and one negative electrode such that said electro-rheological fluid within said piston means solidifies thus controlling the position and movement of the chamber with respect to the piston means; whereby the position of the piston means in relation to the chamber controls the relative position of the exterior of the chamber;
wherein the amount of damping of the shock absorber is controlled by adjusting the amount of compression fluid passing the valve member through control of the relative position of the valve member using the electro-rheological actuating means.

28. The shock absorber of claim 27 wherein said valve member is oriented in the perforation in the damping member, controlling the flow of compression fluid therethrough.

29. A shock absorber comprising:
a casing, said casing including a generally cylindrical chamber containing electro-rheological compression fluid;
a damping member which reciprocates in the chamber and which restricts the flow of fluid through the chamber, the damping member dividing the chamber into a first section and a second section;
the casing being attached to means to anchor the shock absorber at a first end, relative to which the casing does not reciprocate;
the damping member being attached to means to anchor the shock absorber at a second end, relative to which the damping member does not reciprocate;
a by-pass passage external to but in fluid communication with said chamber, said passage permitting fluid communication between the first section and the second section of the chamber;
a valve member in the by-pass passage controlling the flow of fluid between the first and second sections of said chamber, the valve member controlled by electro-rheological actuating means; and
said electro-rheological actuating means comprises a perforated valve member situated within said by-pass passage to permit the flow of electro-rheological fluid therethrough; and electrode means coupled to said perforated valve member for generating an electric field within said valve member such that a second quantity of electro-rheological fluid contained therein solidifies, thereby impeding the flow of the electro-rheological fluid through said bypass passage and thereby creating a compressive damping force by said damping member.

30. A shock absorber, having a first end and a second end, comprising:
a casing, including a first chamber, a second chamber and a divider between the first and second chamber preventing fluid communication between the first and second chambers;
compression fluid within the second chamber;
a rod which reciprocates in the casing, the rod being positioned axially within the first chamber, and passing axially through the divider and the second chamber, and passing out of the casing and terminating at the second end of the shock absorber;
a damping member which reciprocates in the second chamber and which restricts the flow of fluid through the second chamber, the damping member dividing the second chamber into a first section and a second section;
the damping member being attached to that portion of the rod passing through the second chamber so that the damping member does not reciprocate to the second end of the shock absorber;
the casing being attached to means to anchor the shock absorber at its first end, relative to which the casing does not reciprocate;
a by-pass passage external to but in fluid communication with second chamber, said passage permitting fluid communication between the first section and the second section of the second chamber;
a valve member in the by-pass passage controlling the flow of fluid between the first and second sections of the second chamber;
the valve member controlled by electro-rheological actuating means comprising:
a moveable chamber, having an interior filled with electro-rheological fluid and an exterior surface, the relative position of the exterior of the chamber controlling the relative position of the valve member;
bias means providing tension against said moveable chamber;
stationary piston means with the electro-rheological fluid having perforations therethrough permitting the flow of electro-rheological fluid through the piston;

electrode means integral with the piston means for generating an electric field between at least one positive and one negative electrode such that said electro-rheological fluid within said piston solidifies thus controlling the position and movement of the moveable chamber relative to the piston;

whereby the position of the piston in relation to the moveable chamber controls the relative position of the exterior of the moveable chamber.

* * * * *

UNITED STATES PATENT AND TRADEMARK OFFICE
CERTIFICATE OF CORRECTION

PATENT NO.  : 5,161,653
DATED       : Nov. 10, 1992
INVENTOR(S) : Nicholas S. Hare, Sr.

It is certified that error appears in the above-identified patent and that said Letters Patent is hereby corrected as shown below:

Col. 8, line 9:    Change "from" to --fro--

Col. 12, line 15:  After "FIG. 1" insert --as the damping member 20 travels upwards, its supporting arm 18--

Signed and Sealed this

Twenty-eighth Day of September, 1993

Attest:

BRUCE LEHMAN

Attesting Officer    Commissioner of Patents and Trademarks